United States Patent [19]

Byrne et al.

[11] 4,094,555
[45] June 13, 1978

[54] ANTI-SKID CONTROL METHOD AND APPARATUS FOR A BRAKE-EQUIPPED VEHICLE WHEEL

[75] Inventors: Peter Cyril Byrne; Desmond F. Moore, both of Dublin, Ireland

[73] Assignee: PCB Controls Ltd., Dublin, Ireland

[21] Appl. No.: 790,693

[22] Filed: Apr. 25, 1977

[30] Foreign Application Priority Data

Nov. 26, 1976 Ireland ............................... 2597/76

[51] Int. Cl.² ............................................... B60T 8/08
[52] U.S. Cl. ............................. 303/100; 188/181 A; 303/97; 303/105
[58] Field of Search ............ 73/495, 509, 510, 517 R; 180/82 R; 188/181 R, 181 A; 303/20, 97, 100, 104–106; 340/53, 62

[56] References Cited

U.S. PATENT DOCUMENTS

| 3,604,761 | 9/1971 | Okamoto et al. | 303/97 |
|---|---|---|---|
| 3,635,531 | 1/1972 | Okamoto et al. | 303/97 |
| 3,652,133 | 3/1972 | Yamazaki et al. | 303/97 |
| 3,689,120 | 9/1972 | Sumiyoshi et al. | 303/100 |
| 3,870,376 | 3/1975 | Riordan | 303/106 X |
| 3,951,466 | 4/1976 | Guagliumi et al. | 303/97 |
| 3,982,793 | 9/1976 | Jones | 303/106 |

*Primary Examiner*—Stephen G. Kunin
*Attorney, Agent, or Firm*—Haseltine, Lake & Waters

[57] ABSTRACT

An anti-skid control method and apparatus for a vehicle wheel equipped with a brake comprising detecting the deceleration of a vehicle wheel equipped with a brake and comparing the value of deceleration with a reference value of minimum deceleration and also with a reference value of maximum deceleration and controlling the brake force based on this comparison so that independently of the braking operation by the driver, the brake force is released from the wheel if the actual deceleration of the wheel exceeds the reference value of maximum deceleration whereas the brake force is reapplied to the wheel if the actual deceleration of the wheel decreases below the reference value of minimum deceleration. The reference value of maximum deceleration is changed during the braking operation in dependence of a value characteristic of the maximum frictional forces transferrable between the wheel and the road surface.

35 Claims, 10 Drawing Figures

ANTI-SKID CONTROL METHOD AND APPARATUS FOR A BRAKE-EQUIPPED VEHICLE WHEEL

FIELD OF THE INVENTION

The invention relates to an anti-skid control method for a vehicle wheel comprising the steps of detecting the deceleration of the wheel and comparing it with a predetermined value of minimum deceleration and also with a reference value of maximum deceleration, in order to control a reservoir brake pressure such that, independent of the position of the brake operating means controlled by the driver, the reservoir brake pressure is released from the wheel if the actual deceleration of the wheel exceeds the reference value of maximum deceleration, and such that the reservoir brake pressure is fully reapplied to the wheel if the actual deceleration of the wheel decreases below the predetermined value of minimum deceleration.

The invention also relates to an anti-skid control system for a brake-equipped vehicle wheel and to a vehicle equipped with such an anti-skid control system.

BACKGROUND

Continuously growing traffic density not only involves a relative increase in the risk of accident for single vehicles, but it also leads to a constantly rising number of insufficiently experienced drivers. The average driver usually misjudges vehicle behavior in emergency situations. The false estimation of road surface conditions alone or together with the misjudgment of the handling properties of the vehicle often causes serious accidents which could otherwise be avoided by an accurate estimation of the vehicle behavior and the road surface condition.

A special category of these accidents consists of those due to overbraking and resulting in skidding which can not be controlled by average drivers.

Anti-skid control methods therefore have been developed in order to enable drivers to optimally carry out braking operations even on wet and slippery road surfaces in the case of errors in braking. A survey of the known systems can be found in "Automotive Engineering", Vol. 81 (1973), No. 8, pages 27 to 37.

All these known methods use deceleration of one or more vehicle wheels as an indicator or incipient skidding behavior. In principle, control actions are initiated after an upper deceleration value has been exceeded at the wheel(s) to be controlled, e.g. by releasing the applied brake pressure until the skidding condition is avoided. Most of these known methods require expensive electronic means and complicated hardware to perform their control functions. These prior art anti-skid control systems have proved to be unsatisfactory.

British Pat. No. 1,385,743 describes an anti-skid control method for a vehicle having several brake-equipped vehicle wheels where releasing and reapplying brake pressure is controlled dependent on several parameters detected independently of each other. A control action is initiated, firstly, when either the speed signal of one wheel differs by a predetermined amount from the speed signal of the fastest rotating wheel, or, secondly, when the deceleration of a wheel exceeds a predetermined deceleration value, or thirdly, when a wheel speed signal decreases below a value corresponding to a computed reference speed. This prior art system controls the magnitude of air pressure supplied to the brakes dependent on the actual braking situation. In the second system, the detected decelerations of all wheels are compared to a predetermined fixed deceleration reference value and a trigger signal is generated when the deceleration signal of any of the wheels exceeds this reference value. This predetermined deceleration value is fixed and not self-adapting to road friction changes. Therefore this predetermined deceleration value may be chosen according to dry friction conditions and, hence, may be relatively high, which can result in an initiation of control action under wet or slippery surface conditions which is too late. But if instead of this the upper deceleration value chosen is relatively low which is representative of low friction conditions, the control actions will be initiated on dry surfaces at the instant at which the maximum obtainable deceleration has not yet been reached.

Another prior art anti-skid control method for a vehicle wheel is described in British Pat. No. 1,378,368. Therein, the deceleration of the wheel is detected and compared with a predetermined constant value for minimum deceleration and also with a constant reference value for maximum deceleration. A reservoir brake pressure is controlled such that, independent of the position of the brake operating means actuated by the driver, the reservoir brake pressure is released from the brake when the actual deceleration of that wheel exceeds the constant reference value for maximum deceleration and the reservoir pressure is fully reapplied to the brake if the actual deceleration of the wheel decreases below the predetermined constant value for minimum deceleration. The reservoir brake pressure is fully reapplied after the minimum deceleration value has been reached, in order to quickly increase the actual deceleration, to a value suitable for transferring relatively high frictional forces, such that the slip is in the range about 15 to 20%. After this time interval, if the desired deceleration has been reached, the brake pressure is slowly increased until the constant reference value for maximum deceleration is again exceeded. By this method, the frequency of operation of the system can be reduced to some extent and the available frictional force level can be somewhat better utilized. However, the use of a constant predetermined value for maximum deceleration implies the same disadvantages as identified above: the system is not self-adaptive to changes of road surface conditions, because always the same deceleration reference value initiates the system control actions.

SUMMARY OF THE INVENTION

It is an object of the invention to provide an anti-skid control method and apparatus for a vehicle wheel, which is self-adapting to variable road surface friction conditions and which makes it possible to obtain high deceleration rates of the vehicle even if changing friction conditions occur during the braking operation.

According to one aspect of the invention, there is provided an anti-skid control method for a vehicle wheel comprising the steps of detecting the deceleration of said wheel and comparing it with a reference value of minimum deceleration and also with a reference value of maximum deceleration, in order to control the brake force so that, independently of the position of the brake operating means controlled by the driver during braking, said brake force is released from said wheel if the actual deceleration of said wheel exceeds said reference value of maximum deceleration, and such that said brake force is reapplied to the wheel if the actual deceleration of said wheel decreases below said reference value of minimum deceleration, said reference value for maximum deceleration being changed during a braking operation in dependence on a value characteristic of the maximum frictional forces transferable between the wheel and the road surface. The method of the invention makes possible the use of an upper deceleration value, which is to be compared with wheel deceleration, said value being optimally adapted to the actual road surface conditions. On slippery surfaces, this value is relatively low, whereas in the case of dry road conditions (high frictional coefficient) said value is relatively high. Thereby, it is possible to utilize optimally the available friction between the road surface and the wheel in order to obtain optimal deceleration; the instant at which the brake release trigger control signal is generated, adapts to the actual friction conditions, which, for example, avoids generation of the trigger signal at an excessive deceleration value under slippery or wet surface conditions. On the other hand, on a surface with a high coefficient of friction, a relatively high deceleration value may be reached before the control actions are initiated.

An optimal practical utilization of the range of maximum frictional forces between the wheel and the road can therefore be obtained by the method of the invention.

Preferably, said value characteristic of the maximum frictional forces is determined by continuously computing a value $k$ according to the formula $$k = (1/r)(M_B - I \cdot \ddot{\theta})$$

wherein $r$ denotes the rolling radius of said wheel, $M_B$ denotes the actual brake torque acting on said wheel, $I$ denotes the moment of inertia of said wheel and $\ddot{\theta}$ denotes the actual deceleration of said wheel, and by equating the said characteristic value and the value $k$, whereby in the case of a decrease of the value $k$ the characteristic value is maintained constant during subsequent time intervals, each of which having a predetermined duration, the constant value of said characteristic value being equal to the initial value of $k$ at the beginning of the respective time interval, this being repeated until in the course of a time interval the actual value of $k$ reaches or exceeds said initial value. The value $k$ can quickly and easily be detected in the vehicle or at the wheel, being a measure of the actual friction force transmitted between the wheel and the road; the values for $r$ and I are known and the brake torque $M_B$ as well as the actual wheel deceleration $\ddot{\theta}$ can continuously be detected by suitable measuring means.

The actual brake torque applied to the wheel must be equal to the sum of the effective actual friction torque $M_f$ and the deceleration moment according to $$M_B = I \cdot \ddot{\theta} + M_F$$

Transforming this equation into $$M_f = M_B - I \ddot{\theta}$$

and using $$M_f = F \cdot r$$

(with $F$ denoting the actual force of friction between the wheel and the road), the friction force F can be computed by $$F = (1/r)(M_B - I \ddot{\theta})$$

which is identical to the above mentioned formula for the value $k$ which is therefore equal to the actual frictional force F between the wheel and the road. Thereby, the upper deceleration value is always adapted to maximum actual friction forces. The variation of the friction force is preferably continuously monitored during each time interval between reapplying and releasing the reservoir brake pressure whereby the maximum friction force which occurs is stored, and used to determine the upper deceleration value. If the overbraked vehicle moves from a high coefficient of friction surface (e.g. dry concrete) to a low coefficient of friction surface (e.g. sheet ice), a sudden decrease in the level of maximum friction forces occurs. In this case, the high maximum friction value stored before will be lowered stepwise during subsequent time intervals until it reaches the newly stored actual maximum (lower) value of $k$. Thereby a small and short decrease of $k$ from the stored maximum value, which is practically unavoidable, has no practical influence on the stored value if said difference does not continue longer than one of said time intervals. The choice of the length of these time intervals greatly influences the sensitivity of the method.

Preferably, each of said time intervals has a duration of between 1/10 and ½ seconds, which gives a practical optimization with a good sensitivity to changing surface conditions and also avoids undesired scattering of the stored values.

In order not to continuously change the stored deceleration value during the beginning of a braking operation with firstly increasing friction forces, it is preferable that this reference value for maximum deceleration be set to a predetermined initial value at the beginning of a braking operation and is replaced by a new value only when the value of the increasing characteristic value exceeds said predetermined initial value or if said characteristic value reaches a first maximum.

Where the brake is operated by pressurized fluid, a reservoir brake pressure may additionally be controlled during a braking operation by adjusting it to the pressure level which was actually operating on the brake at the time when the reference value for maximum deceleration was reached, said adjustment being effected after the reservoir brake pressure has been released from the brake. Thereby, the pressure in the pressure reservoir is always adjusted to a level which is adapted to the pressure just necessary to operate on the brake for obtaining optimal friction forces.

Preferably, an initial predetermined reservoir brake pressure is used at the beginning of a braking operation until the actual deceleration of the wheel firstly exceeds the reference value for maximum deceleration and the reservoir brake pressure is firstly released from the wheel.

Preferably, said initial predetermined reservoir brake pressure is either adjustable by the brake operating means activated by the driver or equal to a main pressure from a main pressure reservoir of the vehicle. At the beginning of a braking operation, therefore, the first deceleration effect is obtained by firstly fully applying said initial brake pressure (e.g. from the main pressure reservoir) to the brake; the initial brake pressure is preferably chosen to be sufficiently high to induce the actual deceleration of the wheel to exceed the initial reference value for maximum deceleration of the wheel and then to initiate a trigger signal. During this first deceleration period, the actual friction force is continuously monitored and its maximum value is stored; the actual braking pressure effective on the brake is also continuously measured and its value is stored at the time, when the trigger signal is generated, the reservoir brake pressure level is then set to said stored value, and the upper deceleration value is set to a value dependent on the characteristic value. Thus, when the reservoir brake pressure is reapplied to the brake, its level is only high enough to produce a wheel deceleration in the range which yields maximum friction forces. Moreover, the use of a variable pressure level in the reservoir dependent on road surface conditions results in a variable rate of increase of actual braking pressure to a variable level. A high reservoir brake pressure level causes a high rate of increase of actual braking pressure to a high level and a low reservoir brake pressure level results in a correspondingly smaller rate of increase of actual brake pressure to a lower level. Therefore higher decelerations can be reached on high coefficient of friction surfaces than in the case of low coefficient of friction surfaces, where smaller decelerations occur.

The method of the invention permits excellent utilization of vehicle deceleration values obtainable on a road surface where the friction conditions of the road surface change with respect to stopping distance. Thus a very short stopping distance can always be obtained using a control method which is truly automatically adaptive to surface conditions.

According to a further aspect of the invention there is provided an anti-skid control system for a brake-equipped vehicle wheel, said system being especially able to carry out the above described method of the invention. In one preferred embodiment, this system comprises means for detecting the actual deceleration of said wheel, means for applying a reservoir brake pressure to said brakes to actuate them when the actual deceleration of said wheel decreases below a predetermined value of maximum deceleration and for releasing said reservoir brake pressure from said brakes when the actual deceleration of said wheel exceeds a reference value of maximum deceleration, signal generating means to generate input signals to the means for applying and releasing the reservoir brake pressure, said signal generating means comprising means for determining the difference between a signal dependent on the brake torque and a signal proportional to the actual deceleration of the wheel, means for continuously storing the maximum value of said difference, and means for generating an output signal equal or proportional to said maximum difference stored. The means for determining the difference may, preferably, be an electronic circuit means. Preferably also, said electronic circuit means for determining said difference may comprise an operational amplifier connected to operate as a subtractor, with the signal dependent on the brake torque being applied as a voltage signal to one input of the subtractor and the signal proportional to the actual deceleration of the wheel being applied to the second input thereof. The means for continuously storing the maximum value of the difference may be a capacitor which is connected via a diode to the output of said subtractor with the diode being arranged such that it is non-conducting if the magnitude of the output voltage signal of the subtractor is smaller than the magnitude of the voltage signal stored at the capacitor. By the use of said diode, the capacitor can be charged with a practically negligible time constant.

Preferably, the output of the subtractor is connected to the non-inverting input of a further operational amplifier, the output of which being connected via said diode to said capacitor, the junction of the diode and capacitor being connected to the inverting input of said further operational amplifier.

Preferably, the junction of the diode and capacitor may be connected to the non-inverting input of a first buffer amplifier, a second diode being connected to the output of said first buffer amplifier, a third diode being connected to a variable pre-set voltage, and the other terminals of the second and third diode being connected to each other and to the input of the means for applying and releasing the reservoir brake pressure, the polarity of the second and third diode thereby being chosen such that they are back-biased when the potential of the terminals being connected to each other is higher than the output potential of the first buffer amplifier and the variable voltage respectively.

The other terminals of the second diode and third diode may also be connected to the means for applying and releasing the reservoir brake pressure via a second buffer amplifier.

Preferably, the anti-skid control system of the invention may comprise a discharging resistor to give a discharging time constant for the capacitor. Said discharging resistor may be adjustable.

Preferably, there may further be provided means to set an initial value for said reference value of maximum deceleration, whereby in the initial range of braking operation a continuous change in the stored reference value for maximum deceleration caused by the initial increase of frictional forces between wheel and road can be avoided.

Preferably, the means for applying and releasing said reservoir brake pressure comprises a first comparator circuit comparing the actual deceleration of the wheel with the predetermined value of minimum deceleration and a second comparator circuit comparing the actual deceleration of said wheel with a reference deceleration corresponding to said maximum difference. A quick triggering action may be achieved if the first comparator circuit is a first operational amplifier connected to operate as a comparator, to the inverting input of which a voltage proportional to the predetermined value for minimum deceleration is applied, and to the non-inverting input of which a voltage proportional to said actual deceleration of the wheel is applied, and if the second comparator circuit is a second operational amplifier connected to operate as a comparator, to the inverting input of which said voltage proportional to said actual deceleration of said wheel is applied and to the non-inverting input of which a voltage proportional to a wheel deceleration corresponding to said maximum difference value is applied, the output of said first comparator being connected to a first differentiating circuit and the output of said second comparator being connected to a second differentiating circuit, the output of said first differentiating circuit being connected via a first diode to the set input of a bistable unit controlling, with a first output thereof, reservoir brake pressure control valves, the output of said second differentiating circuit being connected via a second diode equally polarized to said first diode to the reset input of said bistable unit.

Means may be used for generating a pre-determined initial state of the outputs of said bistable unit. Preferably also the means for generating a predetermined initial state may comprise a transistor, the emitter-collector circuit of which is connected between one terminal of a supply voltage means and the second output of the bistable unit, and a capacitor connected in series with a resistor between the other terminal of the supply voltage means and the base of the transistor.

Preferably, the anti-skid control system according to the invention further comprises a reservoir brake pressure control means to control the pressure level in said brake pressure reservoir. To adapt the pressure level in the reservoir brake pressure to the actual brake pressure at the time when the maximum deceleration is reached and a trigger signal is produced, it is preferable that said reservoir brake pressure control means comprises means for storing a signal proportional to said actual brake pressure acting on the brakes of the wheel at said time.

Preferably, the storing means comprises a capacitor chargeable via a first analog gate which can be triggered by the first output of the bistable unit. The inventive anti-skid control system may further comprise a subtractor means to the first input of which a voltage is applied via a buffer amplifier, said voltage being proportional to the voltage at the capacitor and to the second input of which a voltage is applied which is proportional to the pressure in the pressure reservoir, and the output of which is connected via a second output of the bistable unit to the input of a comparator means for comparing the difference in the signal from the second analog gate with upper and lower reference values.

Preferably, the output of the second analog gate is connected to means for generating in a predetermined time period a voltage signal which exceeds the upper limit value when there is no trigger signal from the second output of the bistable unit to the second analog gate. The means for generating a voltage signal may comprise a capacitor chargeable through a resistor and in parallel with the emitter-collector circuit of a transistor the base of which is connected by a resistor to the second input of the bistable unit.

Preferably, there may be provided a first valve means connecting the brake pressure reservoir to a main pressure vessel with a constant pressure level and further be provided a second valve means connecting the brake pressure reservoir to atmosphere, both valve means being controlled by said reservoir brake pressure control means.

Preferably, means are provided for generating an initial reservoir brake pressure signal for the beginning of a braking operation. Said means for generating the initial reservoir brake pressure signal may comprise a conducting line connecting the main pressure reservoir with the brake line leading to the brake, said conducting line being controlled by a third valve means. This ensures that the main pressure generated by a compressor in the vehicle is available at the beginning of a braking operation, said main pressure being sufficient to ensure reaching the reference deceleration value for maximum deceleration even under the best friction conditions, thus ensuring the maximum friction forces will occur and can be measured.

Preferably, the anti-skid control system according to the invention comprises a shut-off means arranged behind the outlet of the brake pressure reservoir to control the brake line to the brake.

Preferably, there is further provided a display device to indicate the actual reference value of maximum deceleration determined during braking operation. By using a suitable value to be indicated, it is possible to inform the driver, for example, of the maximum deceleration which can be reached, or of the maximum friction forces actually available or peak friction coefficient etc., thus continuously instructing the driver objectively on the actual road surface conditions.

Preferably, the valve means is electronically operable, which ensures an especially precise and quick triggering.

Preferably, the brake pressure fluid is compressed air. Under certain circumstances it may also be advantageous to use another pressure fluid, e.g. oil, instead of air, which has to be decided according to each individual application.

According to a further aspect of the invention, there is provided a vehicle equipped with an anti-skid control system as described above.

BRIEF DESCRIPTION OF THE DRAWINGS

In order that the invention may be fully understood and readily carried into effect, an embodiment will now be described, by way of example only, with reference to the accompanying drawings.

DETAILED DESCRIPTION

Figure 1:
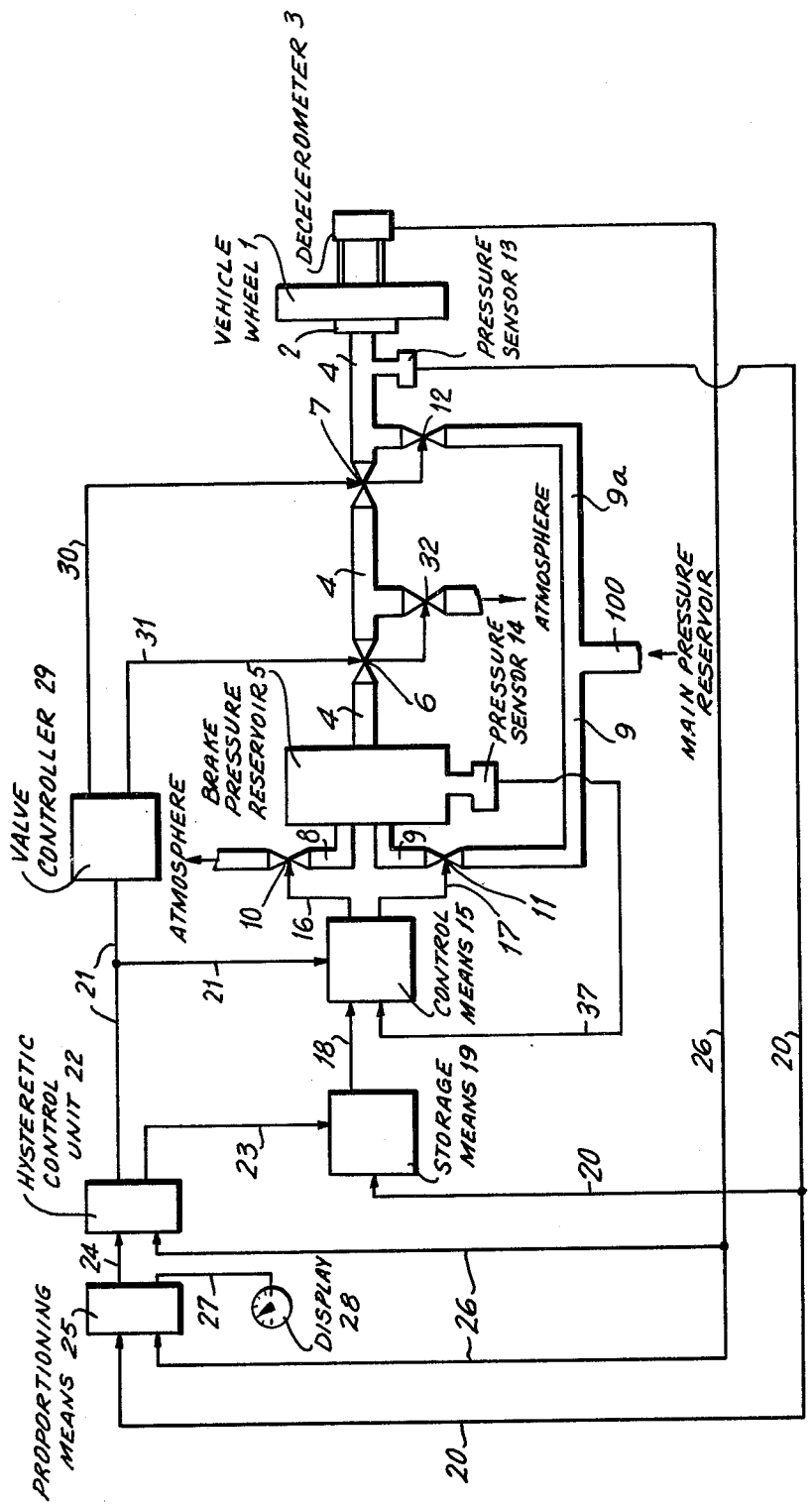
FIG. 1 is a schematic block diagram of the anti-skid control system for a vehicle wheel according to the invention.

The block diagram represented in FIG. 1 shows a vehicle wheel 1 and a braking means 2 adapted to brake vehicle wheel 1. To measure the deceleration of the vehicle wheel 1, there is provided a decelerometer 3 located in a suitable manner to detect the deceleration or acceleration of the wheel 1. A preferred decelerometer means to be used is described in our copending patent Application.

This decelerometer comprises a rotatable electrically-conducting member which may be part of the vehicle wheel, at least one magnet arranged to provide a magnetic field penetrating said member with the field excitation and the field position being at least partially independent of the rotation of the member whereby eddy currents are induced in the member, and a magnetic induction sensor arranged at a position at least partially independent of said member so that a variation of the said eddy currents causes induction of an electrical current in the sensor.

The braking means 2 is actuated via a braking line 4 by means of a pressurized fluid which comes from a brake pressure reservoir 5 via braking line 4 to the braking means 2. There are provided valves 6 and 7 in the braking line 4 which can be controlled and actuated independently of each other.

The brake pressure reservoir 5 is further provided with two other input-lines 8 and 9, line 8 being provided with a valve 10 and line 9 being provided with a valve 11. The line 8 leads to atmosphere in order to lower the pressure level in the brake pressure reservoir 5. Line 9 is connected via line 100 to the main pressure reservoir or source of the vehicle. The main pressure is generated by a suitable means, e.g. by means of a compressor which is on the vehicle. The main pressure is always available in line 100 from which it is introduced into line 9. Line 9 not only leads to the brake pressure reservoir 5, but also via another branch 9a to the braking line 4. The connection point of line 9a and braking line 4 is located between braking means 2 and valve 7 and is situated nearest to braking means 2. Line 9a is also provided with a valve 12 adapted to disconnect line 9a from line 4.

There is further provided a pressure sensor 13 adapted to measure the actual (modulated) brake pressure locally effective on the braking means. Another pressure sensor 14 is also provided at the brake pressure reservoir 5, adapted to measure the pressure level in the brake pressure reservoir 5.

There is further provided a brake pressure reservoir control means 15 to activate the valves 10 and 11 of lines 8 and 9, respectively. If it is desired to lower the pressure level in the brake pressure reservoir 5, the brake pressure reservoir control means 15 generates a pulse via line 16 to valve 10 in order to open it and thereby enable the pressure level of reservoir 5 to be lowered via line 8 to atmosphere. If the desired lower pressure level in the reservoir 5 has been reached and sensed by the pressure sensor 14, the brake pressure reservoir control means 15 closes valve 10 via line 16. The pressure sensor 14 continuously detects the pressure in the reservoir 5 and continuously transmits corresponding signals via line 37 to the brake pressure reservoir control means 15. While the pressure level of pressure reservoir 5 is lowered via line 8, valve 11 remains closed.

If the pressure level of the reservoir 5 is to be increased, the brake pressure reservoir control means 15 causes valve 10 to be closed via line 16 and causes valve 11 in line 9 to be opened via line 17. Thereby the full main brake pressure is connected via line 100 and line 9 to brake pressure reservoir 5 and, thus, increases the pressure level in said reservoir 5. If the desired pressure level in reservoir 5 has been detected by the pressure sensor 14 and if this information has been given via line 37 to brake pressure reservoir control means 15, the valve 11 will close by a signal via line 17.

A further signal from a storage means 19 is also fed to brake pressure reservoir control means 15 via a signal line 18, said signal being proportional to the maximum (locally) active braking pressure on the brakes during the time interval of connecting the reservoir brake pressure to the brakes 2. The brake pressure reservoir control means 15 then controls the pressure level in the reservoir 5 in order to equate it to the value of said maximum (locally) active braking pressure on the braking means. The actual brake pressure continuously detected by the pressure sensor 13 is converted into an electrical signal which is continuously fed to the storage means 19 via a signal line 20. Another input signal is fed to the brake pressure reservoir control means 15 via line 21 from a control means 22 which shall be called the "hysteretic unit" in the following figure description. The hysteretic unit also generates another signal to be fed to the storage means 19 via a signal line 23. The hysteretic unit receives an input signal via line 24 from a proportioning means 25, said signal being proportional to the value of maximum frictional force available between vehicle wheel 1 and the road surface. To determine this value, the proportioning means 25 obtains an input signal via line 20 from the pressure sensor 13 and another input signal from the decelerometer 3 via line 26. Both these input signals are used to determine an output signal to be fed to the hysteretic unit 22, said output signal being proportional to the maximum frictional forces between the wheel and the road surface. The means 25 also generates a second output signal to be fed to a display means 28 via a second output line 27, said display means giving suitable information to the driver of the vehicle on the available braking conditions, e.g. a display of the maximum transmittable braking force, or information on maximum frictional coefficient available, etc.

The hysteretic unit 22 also received another signal from the decelerometer 3 via a line 26, said signal being proportional to the value of the actual deceleration or acceleration detected for vehicle wheel 1. In the hysteretic unit 22 the signal from the means 25 (giving information on the maximum transmittable braking force) and the deceleration signal from the means 3 are compared with each other to generate an ON or OFF signal. If an ON signal is transmitted via line 21 to a valve driver means 29, the valve driver means 29 generates a signal via line 30 in order to open the valve 7 and to close valve 12, and generates another signal via line 31 to open the valve 6 and close valve 32 connecting the portion of braking line 4 situated between valves 6 and 7 with a line to atmosphere. On the other hand, if the hysteretic unit 22 produces an OFF signal via line 21 to the valve driver control means 29, the valve 7 is opened via line 30, while valve 12 is closed, and valve 6 is closed via line 31 while valve 32 is opened to release the brakes. Thereby the actual braking pressure on the braking means 2 is quickly lowered by connecting braking line 4 to atmosphere. The deceleration value at which the ON signal is produced by the hysteretic unit is a fixed pre-set value stored in the hysteretic unit. On the other hand, the deceleration value at which the OFF signal is produced by the hysteretic unit is not a fixed pre-set value, but a function of the peak friction available between vehicle wheel 1 and the road surface. In the case of a low coefficient of friction between vehicle wheel 1 and the road surface, the hysteretic unit 22 sets a small differential value between the fixed preset deceleration value and the upper reference value, while in the case of high coefficient of friction between vehicle wheel 1, and the road surface, a large differential value is set between the two limiting reference values.

The braking line 4 can also be connected directly to the main pressure reservoir by closing valve 7 and opening valve 12 via lines 9a and 100.

The anti-skid control system of the invention operates as follows:

If the driver of a vehicle carries out a braking operation, he begins it by actuating the brake operating means. Thus, firstly valve 7 is closed and valve 12 is opened to connect braking line 4 and between valve 7 and brakes 2 via lines 100 and 9a to the main pressure reservoir. The pressurized fluid may be air produced by a compressor which is on the vehicle.

Thus, an increasing actual local braking pressure is built up at the braking means 2, said pressure being detected by the pressure sensor 13 which generates a corresponding signal via line 20 to the means 25 and also to the storage means 19. The increasing actual braking pressure causes increasing braking effect on the braking means 2. The vehicle wheel is continuously decelerated and the slip between vehicle wheel 1 and the road surface also increases. The actual deceleration is continuously detected by the decelerometer 3 and a corresponding signal is fed to the means 25 as well as to the hysteretic unit 22. Increasing braking force causes increasing frictional force between vehicle wheel 1 and the road surface until a maximum transmittable friction force has been overcome. If no control action is initiated, then the wheel is quickly decelerated until locking, because the friction force is now decreasing as braking force increases. The deceleration of the wheel increases rapidly in this situation. In order to initiate the first control action, an upper deceleration value is stored in the hysteretic unit 22. This stored value is compared with the deceleration signal input via line 26 and, if it reaches this limiting value, the hysteretic unit 22 generates an OFF signal via line 21 to the valve driver control means 29. Thereby the valve 12 is closed via line 30 and valve 7 is opened; valve 6 is closed via line 31 and valve 32 is opened. In this way, line 4 which leads to braking means 2 is disconnected from the main pressure reservoir and is connected to atmosphere. This causes a very quick decrease in braking pressure of the braking means 2 and the deceleration of vehicle wheel 1 decreases accordingly. When the deceleration of vehicle wheel 1 reaches a lower pre-set deceleration value stored in the hysteretic unit 22, said hysteretic unit 22 generates on ON signal via line 21 causing the valve driver control means 29 to close valve 32 and to open valve 6, valve 7 remaining opened and valve 12 remaining closed. Thus braking means 2 is connected via braking line 4 to the brake pressure reservoir 5.

During the first braking cycle, the deceleration signal from the decelerometer 3 and the pressure signal from the pressure sensor 13 are continuously fed to means 25, where the peak friction available is determined and a corresponding signal is fed to the hysteretic unit 22 via line 24. Moreover via line 27 a signal is fed to the display means 28 to inform the driver on the available friction force. The hysteretic unit 22 now sets a new upper deceleration value corresponding to the value of the signal in line 24. When the hysteretic unit 22 produces an OFF signal via line 21, a signal is also fed via line 23 to the storage means 19, causing the pressure value from pressure sensor 13 to be stored. A corresponding signal is continuously fed to the brake pressure reservoir control means 15 via line 18, in which the pressure level of reservoir 5 detected by pressure sensor 13 is compared with the pressure signal from line 18.

If the stored value is greater than the pressure level value of reservoir 5, valve 10 is closed and valve 11 is opened to increase the pressure level in the reservoir 5 by connecting it to the main pressure reservoir via lines 9 and 100. To avoid frequent control actions on the valves because of the existence of small pressure level differences, the brake pressure reservoir control means 15 is adapted so as not to operate unless the difference between the brake reservoir pressure and the peak pressure from the "peak pressure unit" 19 exceeds a certain level. Moreover, the brake pressure reservoir control means 15 is also adapted so as to increase the brake reservoir pressure if two consecutive cycle of control actions are spaced apart more than a certain time interval (e.g. one second). This allows the system to adapt from low friction conditions to high friction conditions during a braking operation. In the time interval between the generation of the first OFF signal by the hysteretic unit 22 and the generation of the first ON signal by the said hysteretic unit 22, a new upper deceleration reference value is set in the hysteretic unit 22 corresponding to the signal from line 24 and also a pressure level in the reservoir 5 is set by the brake pressure reservoir control means 15, said new pressure level being high enough to build up the wheel deceleration corresponding to the peak friction detected.

If therefore after the generation of the first OFF-signal by the hysteretic unit 22 (corresponding to the initiation of the first control operation) the high deceleration of vehicle wheel 1 is being reduced, a new upper deceleration reference value is set in the hysteretic unit 22 during the time interval until a new ON-signal is again produced by the hysteretic unit 22 in order to reactivate the braking means 2, said new upper deceleration reference value corresponding to the signal in line 24 which indicates the deceleration value corresponding to about the peak friction force detected. In this time interval also a new pressure level is set in the brake pressure reservoir 5 by the brake pressure reservoir control means 15, said new pressure level being just sufficient to generate via line 4 a braking torque on the vehicle wheel 1 by the braking means 2, said torque being just suitable to build up the peak friction force detected before.

If after generation of the first OFF-signal, the deceleration value of the vehicle wheel 1 has again reached the lower deceleration reference value, the braking means 2 is connected via line 4 to the pressure of the brake pressure reservoir 5 by a signal from the hysteretic unit 22. The whole operation described before will be repeated, wherby now the newly increasing deceleration of vehicle wheel 1 is limited by the new upper deceleration reference value having been set just before in the hysteretic unit 22 by the signal in line 24. The newly set upper deceleration reference value is normally lower than the former one, because it is advantageous to choose the upper deceleration reference value (firstly stored in the hysteretic unit 22) high enough to ensure in each case (even on very dry, high coefficient of friction surfaces) the attainment of peak friction during the first braking operation. Since in that case also the pressure level newly set in the brake pressure reservoir 5 is lower than the first available one, the braking torque on vehicle wheel 1 during the second braking operation is increasing at a lower rate than during the first braking operation (because of a lower pressure level in the brake pressure reservoir 5), and, moreover, the OFF-signal will be generated by hysteretic means 22, even at a lower upper deceleration reference value.

Figure 2A:
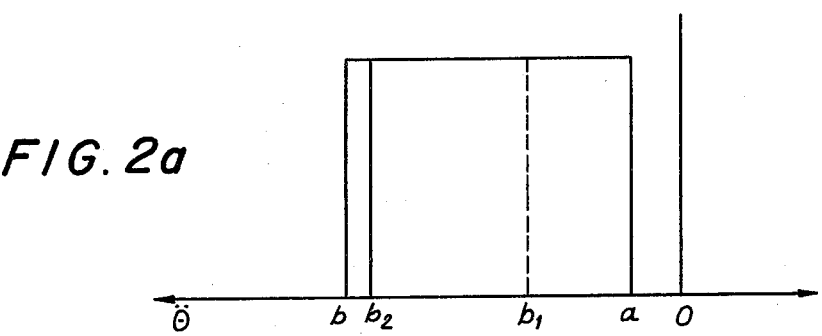
FIG. 2A is a diagram showing the position of the upper and the lower deceleration values, these values controlling the initial control actions.

FIG. 2A is a schematic diagram showing the changing position of the upper deceleration reference value controlled by the hysteretic means 22: the ordinate of the diagram may be regarded as the representation of a trigger-signal, whereas the abscissa of the diagram represents deceleration values of vehicle wheel 1. Starting from central point O, positive acceleration values are represented at the right hand side, whereas deceleration (negative acceleration) values are represented at the left hand side of the diagram. If a braking operation is starting, the deceleration of vehicle wheel 1 first continues to increase from value 0 until the pre-set upper deceleration reference value $b$, for generating the first control operation, by hysteretic unit 22 has been reached. When this upper deceleration reference value has been reached, the hysteretic unit 22 generates an OFF-signal which is fed to the valve driver control means 29 and this releases the applied braking pressure to atmosphere. Thus, the deceleration of vehicle wheel 1 decreases quickly to smaller deceleration values (to the right in FIG. 2A) until it reaches the fixed lower deceleration reference value $a$ pre-set in the hysteretic means 22. After this value has been reached, the reservoir brake pressure from the brake pressure reservoir 5 is reapplied to the braking means 2, thus causing a new deceleration increase of vehicle wheel 1 (in FIG. 2A, deceleration shifts to the left). But in the meantime, the previously used upper deceleration reference value $b$ has been replaced by a new upper deceleration reference value $b_2$ corresponding to the deceleration of vehicle wheel 1 just at the time when peak friction had been reached previously. If this peak friction force is relatively high (e.g. in the case of a dry, high coefficient-of-friction surface), the new upper deceleration reference value $b_2$ is not very different from the former one $b$. But if the road has a slippery low coefficient-of-friction surface, a new upper deceleration value $b_1$ will be set in the hysteretic unit 22, said new reference value $b_1$ being much smaller than the previous one. If during a braking operation on a high coefficient-of-friction surface (corresponding to a relatively high upper deceleration reference value, e.g. $b_2$ in FIG. 2A) the vehicle goes suddenly on to a new road surface having substantially worse frictional characteristics, than a new upper deceleration reference value (e.g. $b_1$) will be set in the hysteretic unit 22, correspondingly lower than the previous one. If then the upper deceleration reference value $b_2$ (which is set in the hysteretic unit 22) has been reached, the brake pressure is released and reapplied after the lower deceleration reference value $a$ has been reached; then the brake pressure will be released after the new (lower) upper deceleration reference value $b_1$ has been reached.

Figure 2B:
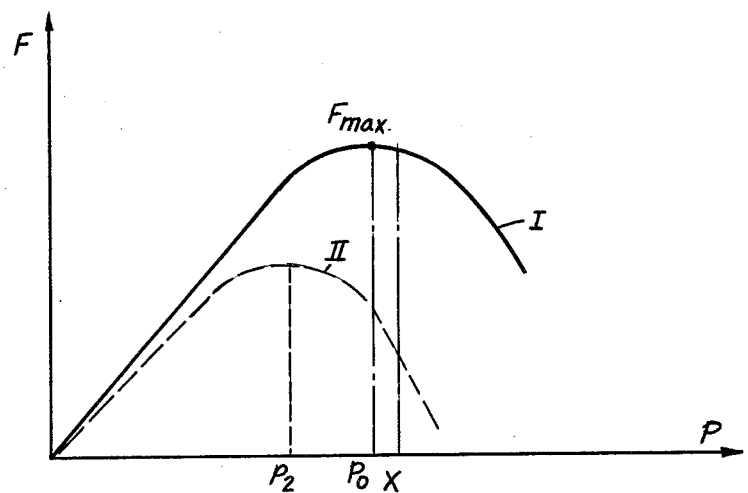
FIG. 2B graphically shows the friction force as a function of actual brake pressure effective on the brakes in the case of unchanged frictional conditions at the road-wheel interface.

FIG. 2B shows the friction force as a function of actual brake pressure effective on the brakes in the case of unchanged frictional conditions at the road-wheel interface. Curve I represents the results for a high coefficient-of-friction surface (e.g. dry concrete), and curve II represents the results for a surface having substantially worse frictional characteristics (e.g. smooth ice).

As can be seen from the diagram, increasing braking pressure $p$ causes firstly an increasing friction force (or braking force) which reaches a maximum and then decreases quickly as $p$ continuously increases. This behavior is very similar for different surfaces, as can be seen from the curves of FIG. 2B. If the brake pressure effective on the vehicle wheel is further increased after the peak friction has been reached (as in the case of full braking using an uncontrolled braking system), the deceleration of the vehicle wheel continuously increases because of continuous increase of braking torque and simultaneously decreasing friction force; thus the vehicle wheel very quickly approaches a locked condition.

Figure 2C:
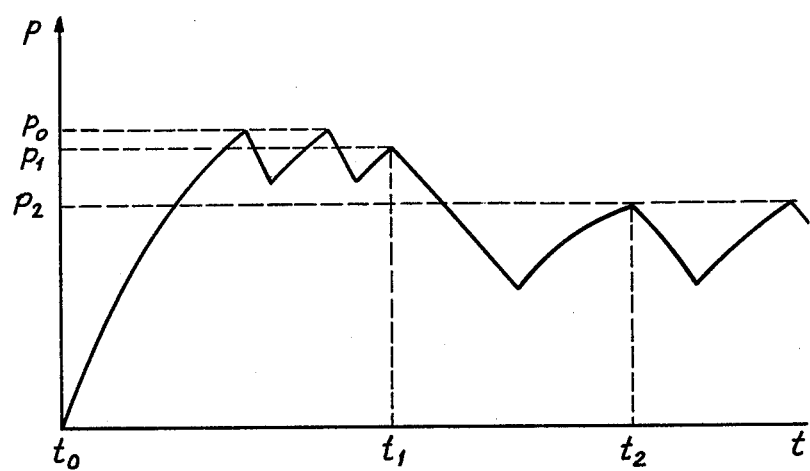
FIG. 2C graphically shows the actual brake pressure effective on the brakes as a function of time during braking operation in the case of changing frictional conditions at the road-wheel interface.

By the use of the anti-skid control system of the invention, the first braking operation ensures the reaching of the peak of the frictional curve even on high coefficient-of-friction surfaces because of the sufficiently high upper deceleration reference value $b$, and this peak friction point may even be exceeded (e.g. point X in FIG. 2B). During the increase of deceleration, the various parameters detected by the system are evaluated an analyzed, and thus both the value of maximum effective frictional force F maximum as well as the value of the braking pressure effective at the braking means 2 at the instant of pressure release are detected and evaluated. Corresponding to the value of the maximum frictional force detected previously, a new upper deceleration reference value $b_2$ will be set in the hysteretic unit 22, and simultaneously also the pressure level in the brake pressure reservoir 5 is set to a level corresponding to the value of the braking pressure locally effective on the braking means 2 at the time of releasing brake pressure. If the vehicle suddenly goes on to a low-coefficient-of-friction surface (e.g. corresponding to curve II in FIG. 2B), this implies that the reservoir brake pressure in the brake pressure reservoir 5 causes the new effective curve II (illustrated in dotted lines in FIG. 2B) to be traversed through to a point substantially beyond the curve's peak. Simultaneously, the new maximum value of frictional force corresponding to this new curve II is detected and, correspondingly, a new upper deceleration reference value $b_1$ is set in the hysteretic means 22 as well as a new pressure level $P_2$ in the brake pressure reservoir 5, said new pressure $P_2$ corresponding to the actual brake pressure effective on the vehicle wheel at the time when the brake pressure release operation is initiated. FIG. 2C shows the curve of actual brake pressure effective on the brakes as a function of time during a controlled braking operation, the vehicle wheel 1 initially being braked on a high-coefficient-of-friction surface, but going onto a low-coefficient-of-friction surface during the braking operation. The braking operation is initiated at time $t_o$, whereby the actual brake pressure effective on the braking means 2 is increased during said time until the pre-set upper deceleration reference value $b$ has been reached. Then the braking action is released, the pressure thus decreasing with time until the fixed, lower deceleration reference value "$a$" has been reached: the brake pressure is then reapplied. Since the vehicle is first travelling on a high-coefficient-of-friction surface, the new upper deceleration reference value, set in the hysteretic unit 22 during said brake releasing time interval, is not very different from the original pre-set value $b$, and also the new brake pressure level established in the brake pressure reservoir 5 is not very different from the originally used initial brake pressure level, namely the main pressure of the whole system. Therefore, the pressure increase as well as the value of the upper limiting pressure $p_o$ for the second cycle are very similar to the respective magnitudes of the first cycle. High-coefficient-of-friction surfaces therefore show a relatively quick pressure increase, because of a high reservoir brake pressure, and therefore a relatively high cycle frequency.

Assume now that the braked vehicle wheel suddenly encounters a low-coefficient-of-friction surface having a much lower frictional coefficient than previously. On this new surface, the relatively high upper deceleration reference value stored in the hysteretic unit 22 will already be reached if a lower braking pressure effective on the braking means 2 occurs (pressure $p_1$ at a time $t_1$) and at this time an OFF-signal from the hysteretic unit 22 releases the braking means 2. Simultaneously, the pressure in the brake pressure reservoir 5 is reset at a new level corresponding to the actual brake pressure $p_1$ effective on the braking means 2 at the time when the releasing operation is initiated. During the period of releasing the braking means, the actual brake pressure effective on the wheel decreases firstly, until the fixed lower deceleration reference value has been reached. Because of the lower frictional coefficient of said surface and, in connection therewith, the slower change in the deceleration of vehicle wheel 1, the time interval until reaching the lower deceleration reference value "a" is longer than in the case of a high-coefficient-of-friction surface. After the lower deceleration reference value "a" has been reached, the newly set brake pressure $p_1$ in the brake pressure reservoir 5 is reapplied to the braking means 2. As the new pressure level $p_1$ is lower than the previously available and applied pressure level, therefore the pressure on the braking means 2 increases more slowly, so that the pressure curve is flatter. During that time, the maximum transferable frictional force (peak friction) is detected in the means 25 and, correspondingly, a new, lower upper deceleration reference value $b_1$ is set in the hysteretic unit 22. This deceleration reference value is reached at the time $t_2$ and the brakes are then released by a signal from the hysteretic unit 22, whereupon simultaneously the actual local braking pressure $p_2$ effective on the wheel 1 is set in the brake pressure reservoir 5 as its new pressure level, with successive cycles being repeated at this lower level. The cycle frequency is now smaller than in the case of a high-coefficient-of-friction surface. If the vehicle wheel 1 during that braking operation again encounters a high-coefficient-of-friction surface, then reaching the new higher peak frictional force will be impossible because the brake pressure level $p_2$ set in the brake pressure reservoir 5 is too low and, thus, the necessary brake pressure required to reach the peak friction is momentarily not available. Simultaneously, the hysteretic unit 22 sets a new upper deceleration reference value $b_2$ which cannot be reached as already pointed out, because of a too low pressure level in the brake pressure reservoir; therefore after the new pressure $P_2$ has been reached on the braking means 2, no releasing of braking operation will be initiated, because the set new upper deceleration reference value is not yet reached. The time interval to the last control action which released the brake pressure from the braking means increases continuously. This is detected by the brake pressure reservoir control means 15. If a fixed pre-set duration of this time interval (e.g. ½ second) has been reached then automatically the pressure level in the brake pressure reservoir 5 will be increased by opening the valve 11, thus connecting the brake pressure reservoir 5 to the main pressure of the compressor. Thus, the pressure level of the brake pressure reservoir 5 will be increased until the new upper deceleration reference value $b_2$ set in the hysteretic unit 2 is reached and detected. Hereafter, the same cycles as in the case of a high-coefficient-of-friction surface will be repeated, as described above.

Figure 3:
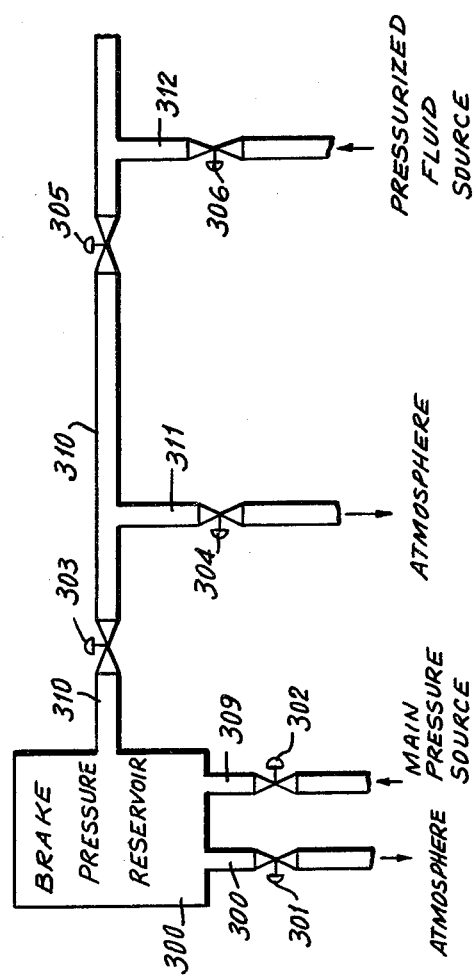
FIG. 3 is a block diagram of the brake pressure reservoir controlling means of the anti-skid control system of the invention.

FIG. 3 is a block diagram of the controlling means of the brake pressure reservoir 300. The brake pressure reservoir 300 comprises a pressure releasing line 308 which is controlled by a valve 301. The brake pressure reservoir 300 also comprises an inlet line 309 which is connected by means of a valve 302 to a main pressure source within the vehicle. The brake pressure reservoir 300 is furthermore connected via a brake pressure line 310 to a braking means of the vehicle wheel. A first valve 303 is located in the brake pressure line 310 behind the brake pressure reservoir 300, said first valve 303 being adapted to shut off the pressure fluid (e.g. pressurized air) coming out from the brake pressure reservoir 300. As illustrated in FIG. 3, there is provided downstream of the valve 303 an air vent pipe 311 branching-off from the brake pressure line 310 and comprising a control valve 304 to open and close said line 311. A second shut-off valve 305 is located in the brake pressure line 310 such that the branching-off point of line 311 is located between said second cut-off valve 305 and the first valve 303. Between said second valve 305 and the braking means for the vehicle wheel, a pressure fluid feed-in line 312 is connected to the brake pressure line 310, said pressure fluid feed-in line 312 being controllable by a shut-off valve 306. A pressurized fluid source can be connected via said line 312 to the brake pressure line 310 behind valve 305 and, thus, the pressure from this source can directly be applied to the braking means.

If the pressure effective on the braking means is to be released, the valves 303 and 306 are closed and the valves 304 and 305 opened. Hereby, the brake pressure is released from the brake pressure line via pipe 311 into the atmosphere. If the brake pressure line 310 is to be connected to the brake pressure reservoir 300, the valves 304 and 306 are closed and the valves 303 and 305 are opened.

The pressure level in the brake pressure reservoir 300 is controlled by the valves 301 and 302; thus, if the pressure level in the brake pressure reservoir 300 is to be lowered, the valve 303 is closed and the valve 301 is opened to enable the releasing of brake pressure to the atmosphere until the pressure level in the brake pressure reservoir 300 has decreased down to the desired value. If, on the other hand, the pressure level in the brake pressure reservoir 300 is to be increased, the valve 301 is closed and the valve 302 is opened.

In case the pressure level of the brake pressure reservoir 300 is to be maintained constant, both the valve 301 and the valve 302 are closed.

The circuitry described in FIGS. 4 to 8 represents one preferred embodiment of the invention, which is especially economical both in cost and energy requirements.

Figure 4:
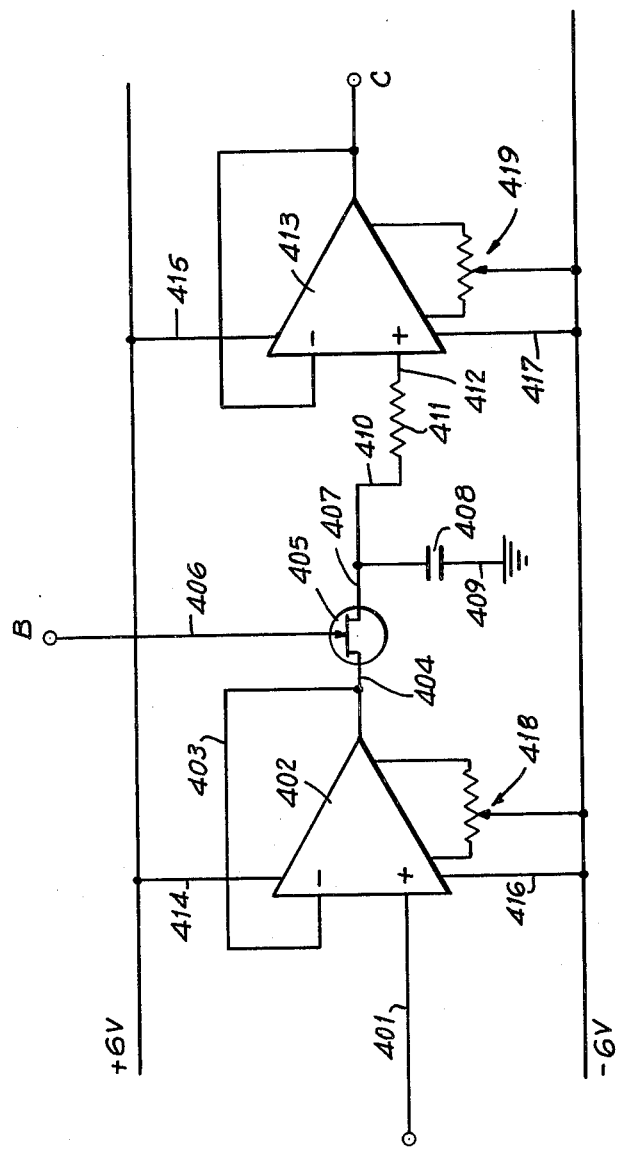
FIG. 4 is an electrical circuit in the anti-skid control system for storing an electrical signal corresponding to the maximum actual brake pressure during one braking cycle.
Figure 6:
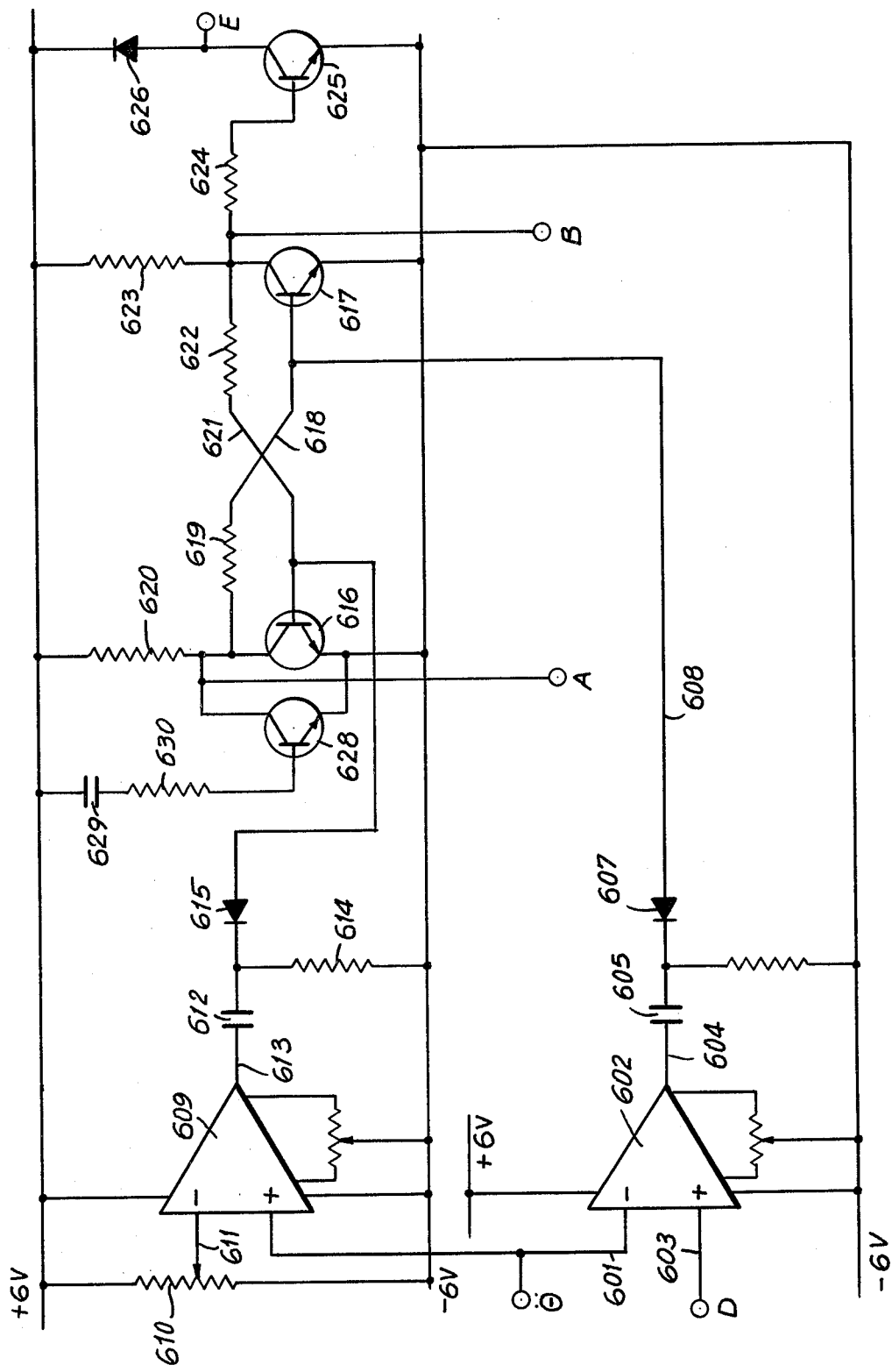
FIG. 6 is an electrical circuit in the anti-skid control system for controlling brake pressure valves and for generating trigger signals to control the circuit of FIGS. 4 and 7.

Referring to FIG. 4, a brake pressure signal is fed by line 401 to the non-inverting input of a first operational amplifier 402 of type 741 the output of which is connected by line 403 to the inverting input of the operational amplifier 402. Thus the operational amplifier is connected to function as a voltage follower which is characterized by unity gain and is used for impedance matching purposes. The output of the first operational amplifier 402 is fed by line 404 to the input of an analog gate 405 of type 2N3819 which is triggered by the potential of point B of the hysteretic unit shown in FIG. 6, point B being connected by line 406 to the trigger input of the analog gate 405. The gate 405 is in the closed state when the potential at point B is negative which, as will be more fully described in respect of FIG. 6, is the case when the deceleration exceeds a certain value.

The output of the analog gate 405 is connected by line 407 to a first connection of a capacitor 408 having a capacity of 1 μF the second terminal of which is connected by line 409 to ground potential. The capacitor is used for storage purposes of the peak-brake pressure signal. The first connection of the capacitor is connected by line 410 to a first connection of a resistor 411 having a resistance of 1MΩ the second terminal of which is connected by line 412 to the non-inverting input of a second operational amplifier 413 of type 741 which, as the first operational amplifier 402, is connected to function as a voltage follower. The output C of the second operational amplifier 413 is the peak-brake pressure signal.

The operational amplifiers 402 and 413 each comprises a power supply input connected by lines 414 and 415, respectively, to a positive $6_v$ voltage and a further power supply input connected by line 416 and 417, respectively, to a negative $6_v$ voltage. Each operational amplifier further comprises two inputs for correcting for the offset voltage which are respectively connected to the fixed terminals of potentiometers 418, 419 having a total resistance of 10 kΩ the adjustable terminal of which is connected to the negative supply voltage.

Figure 5:
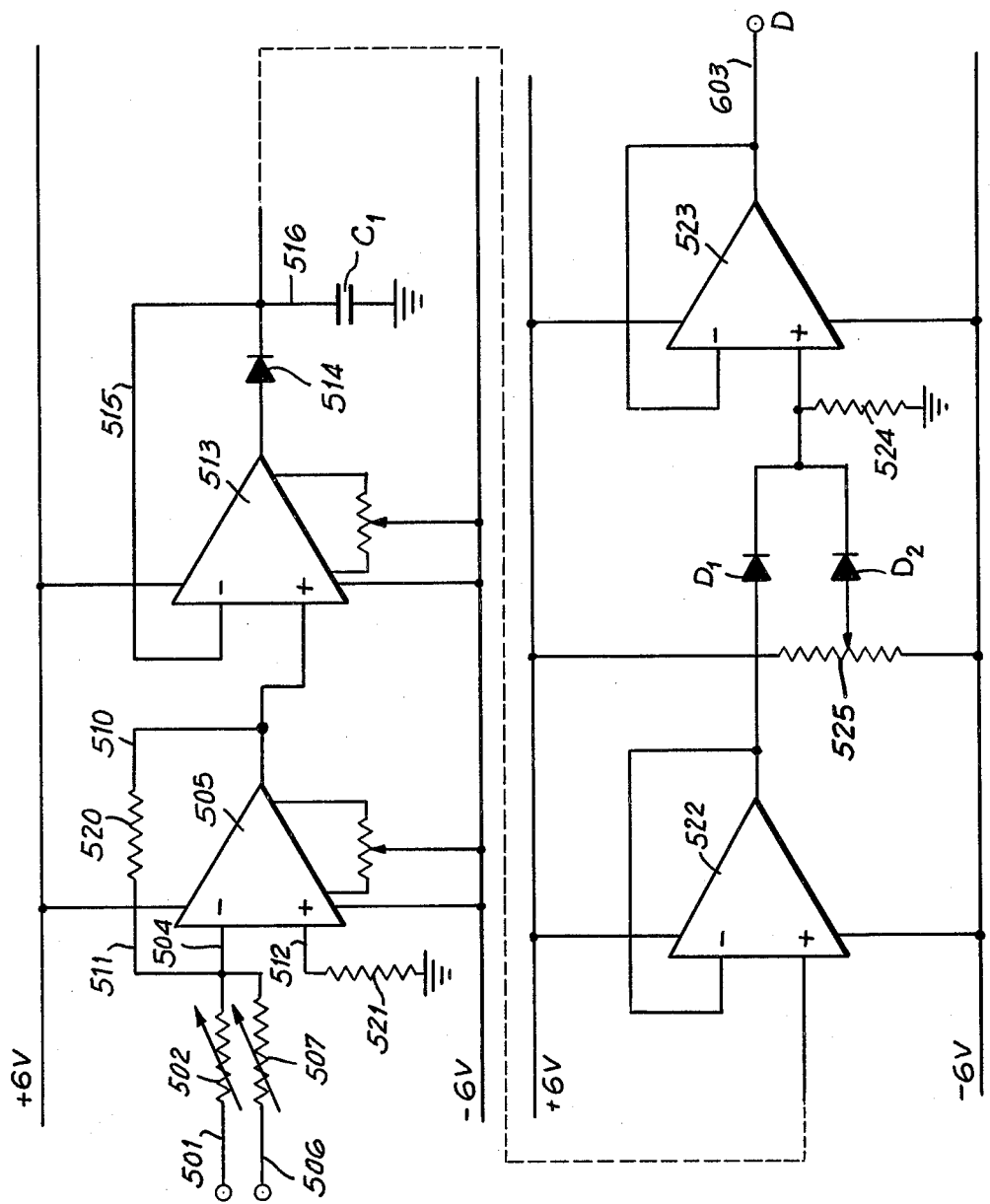
FIG. 5 is an electrical circuit in the anti-skid control system for storing a signal corresponding to the maximum braking force reached.

Referring now to FIG. 5, a peak-friction unit is shown. A deceleration signal is fed by line 501 to one terminal of a variable resistor 502 having a total resistance of 1 MΩ the other terminal of which is connected by line 504 to the inverting input of a first operational amplifier 505 of type 741. A brake pressure signal is fed by line 506 to one terminal of a variable resistor 507 having a total resistance of 1 MΩ the other terminal of which is also connected to the inverting input of the first operational amplifier 505. The output of operational amplifier 505 is fed to a resistor 520 having a resistance of 1 MΩ by line 510 with the other terminal of the resistor being connected to the inverting input of the operational amplifier 505 by line 511. The non-inverting input of the operational amplifier 505 is connected by line 512 to a grounded resistor 521 having a resistance of 470 kΩ.

The output of the first operational amplifier 505 is also fed to the non-inverting input of a second operational amplifier 513 the output of which is fed to a diode 514 the other terminal of which is connected by line 515 to the inverting input of the second operational amplifier 513. The polarity of the diode 514 is chosen to be such that the diode is forward biased when the output of the amplifier 513 is positive in respect of the terminal of the diode 514 which is connected to the inverting input of the amplifier. The output of the diode 514 is also connected to a capacitor $C_1$ of 1μF by line 516, the other side of the capacitor $C_1$ being grounded.

The output of the diode 514 is further connected to the non-inverting input of a third operational amplifier 522 the output of which is connected to its inverting input and to a diode $D_1$ the other terminal of which is connected to the non-inverting input of a fourth operational amplifier 523 the output of which is connected to its inverting input and via line 603 to the non-inverting input of the operational amplifier 602 shown in FIG. 6. The non-inverting input of operational amplifier 523 is further connected to a resistor 524 having a resistance of 10 kΩ, the other terminal of which is grounded, and to diode $D_2$, the other terminal of which is connected to the wiper terminal of a potentiometer 525 with the fixed terminals thereof being connected to positive and negative power supply potentials, respectively, and having a total resistance of 10 kΩ. The polarity of the diodes $D_1$ and $D_2$ is chosen such that they are back-biased when the terminals thereof connected to the non-inverting input of amplifier 523 are at a higher potential than the other terminals thereof.

The power supply of the operational amplifiers and the correction for offset voltages are provided as described in respect to FIG. 4.

The peak-friction unit operates as follows: A fixed fraction of the deceleration signal is subtracted from a fixed fraction of the brake pressure signal and the resulting signal is fed to a peak-reading circuit, where the peak value of the signal is stored. The diode 514 remains back-biased unless a positive voltage at the non-inverting terminal of the second operational amplifier 513 is greater than the voltage across the capacitor $C_1$. When the diode 514 conducts it increases the capacitor voltage up to the voltage at the non-inverting terminal of operational amplifier 513.

The circuitry formed by operational amplifiers 522 and 523, diodes $D_1$ and $D_2$, and resistors 524, 525 is provided because the OFF level of the hysteretic unit can never be greater than the ON level (or else faulty operation of the system occurs). It operates as follows: When the system is not in use, the output voltage from the capacitor $C_1$ falls to zero as the capacitor discharges. If this zero voltage were applied to the hysteretic unit, the maximum deceleration reference level would also be set to zero and, to prevent this, the output from the capacitor $C_1$ is brought via buffer amplifier 522 and diode $D_1$ to the other buffer amplifier 523. The second diode $D_2$ connects the wiper terminal of the potentiometer 525 to the same input terminal. When the voltage $V_1$ of amplifier 522 which is applied to diode $D_1$ is greater than the output voltage $V_2$ picked up at the wiper terminal and being applied to diode $D_2$, then $V_2$ appears at the output, thus the minumum voltage at the output is $V_2$, which is set by the potentiometer 525 at the required level.

Referring now to FIG. 6, the hysteretic unit is shown. The deceleration signal is fed by line 601 to the inverting input of a first operational amplifier 602 whereas the peak-friction signal is fed by line 603 to the non-inverting input of the amplifier 602. The output of the amplifier 602 is connected by line 604 to a capacitor 605 having a capacity of 0.005 μF the other terminal of which is connected to a resister 606 of 220 kΩ and to a diode 607 of type OA90 the other terminal of which, by line 608, is connected to one of the inputs of a bistable (flip-flop) unit. The second terminal of the resistor 606 is connected to the negative power supply potential. The polarity of the diode 607 is chosen to be such that the diode conducts when the terminal connected to the capacitor 605 is of lower potential than its other terminal.

The deceleration signal is also fed to the noninverting input of a second operational amplifier 609. A fixed reference signal is fed to the inverting input of the operational amplifier 609. The fixed reference signal is obtained by connecting the adjustable terminal of a potentiometer 610 by line 611 to the inverting input of the operational amplifier 609 with the fixed terminals of the potentiometer 610 being connected to the positive and negative power supply potentials, respectively, of the operational amplifiers.

The output of the operational amplifier 609 is connected to a capacitor 612 by line 613, the other terminal of the capacitor being connected to a resistor 614 and a diode 615. The other terminal of the resistor 614 is connected to the negative power supply potential, the other terminal of the diode to the second input of the bistable unit. The capacity of the capacitor 612, the resistance of the resistor 614 and the polarity as well as the type of the diode 615 are chosen to be equal to those of capacitor 605, resistor 606 and diode 607, respectively.

The bistable unit comprises two transistors 616 and 617 of type BC 148, the emitters of which are connected to the negative power supply potential. The base of the transistor 617 is connected by line 618 to a resistor 619 of 82 k$\Omega$ the other terminal of which is connected to an output A of the bistable unit. The output A is further connected to the collector of the transistor 616 and one of the terminals of a resistor 620 of 680$\Omega$ the other terminal of which is connected to the positive power supply potential. Similarily, the base of the transistor 616 is connected by line 621 to a resistor 622 of 82 k$\Omega$ the other terminal of which is connected to a second output B of the bistable unit, this output B is also connected to the collector of the transistor 617 and a resistor 623 of 680$\Omega$ the other terminal of which is connected to the positive power supply potential.

The output B is connected to one terminal of a resistor 624 having a resistance of 100$\Omega$ the other terminal of which is connected to the base of a transistor 625 of type 2N3055. The emitter of transistor 625 is connected to negative power supply potential, the collector thereof through a diode 626 of type 1N4001 to positive power supply potential. The polarity of the diode 626 is chosen such that it is back-biased with the potentials occurring under operation. The resistor 624, the transistor 625, and the diode 626 form a simple power amplifier for driving the solenoid circuits shown in FIG. 8.

The power supply for the operational amplifier 602 and 609 and the correction for offset voltages are provided as described with reference to FIG. 4.

The operational amplifier 602 as well as the operational amplifier 609 are connected so as to function as a comparator, i.e., when the voltage at the non-inverting terminal is greater than the voltage at the inverting terminal, the output saturates to a high level, and when the voltage at the non-inverting terminal is less than the voltage at the inverting terminal, the output saturates to a low level. At operational amplifier 609, an increasing deceleration signal is compared with a fixed reference signal and, if greater, then the output goes from a low to a high level. This signal is transmitted to the bistable unit through a differentiating circuit, consisting of the capacitor 612 and the resistor 614. The differentiated output pulse of the comparator is not transmitted by the diode 615. As the deceleration is further increased it becomes greater than the second reference signal set by the peak-friction unit (i.e. by the output of FIG. 5). This causes the other comparator to switch from a high to a low level. This signal is transmitted through the other differentiator, consisting of capacitor 605 and resistor 606, yielding a negative pulse which passes through the diode 607 and reverses the state of the bistable unit. This causes the brake pressure to be reduced. As the deceleration reduces, it becomes less than the reference signal in the second comparator, thus causing it to switch from a low to a high level. The differentiated pulse is not transmitted through the diode 607. As the deceleration is further reduced, it becomes less than the first fixed reference level and the corresponding comparator switches from a high to a low level. This differentiated pulse is transmitted by the diode 615 and the bistable unit is reversed. This causes brake pressure to be reapplied through the brake pressure reservoir. This cycle is repeated many cycles per second during an overbraking situation. The brake pressure is applied and reapplied by means of the output stage of the circuit. Here two solenoid-operated two-way valves 303 and 304 are operated by means of the bistable unit and the power transistor 625.

The output B is connected to the trigger input of the analog gate 405 of FIG. 4. The output B is at a high level during the phase of increasing brake pressure, thus causing the gate 405 to be in the open state, and at a low level during the phase of decreasing pressure, thus causing the gate to be in the closed state.

To enable application of the brake pressure initially and to set the voltages at their initial correct levels, the output A of the bistable unit is further connected to the collector of a transistor 628 of type BC 148 the emitter of which is connected to negative power supply potential. The positive power supply potential is connected to the base of the transistor 628 through a capacitor 629 having a capacity of 0.005 $\mu$F and a series resistor 630 having a resistance of 82 $k\Omega$. When the supply is switched on, the capacitor 629 acts as a short circuit and transistor 628 switches on for a short time, bringing the point A down to a low voltage. The point B is then automatically set high.

Figure 7:
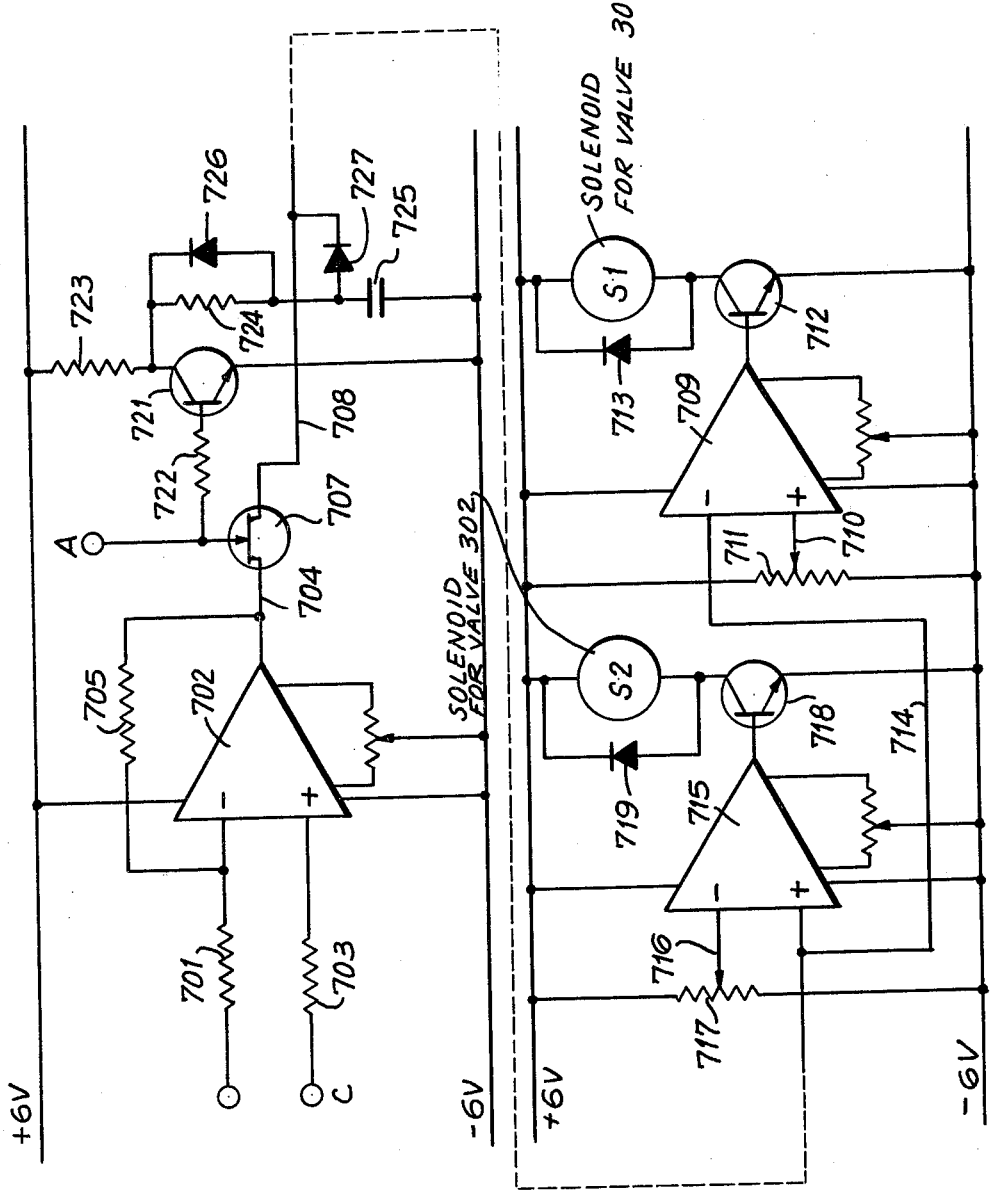
FIG. 7 is an electrical circuit in the anti-skid control system to control the reservoir brake pressure level dependent on surface conditions.

Referring now to FIG. 7, circuitry is shown for establishing the pressure in the pressure reservoir.

The reservoir pressure signal is fed through a resistor 701 of 1 M$\Omega$ to the inverting input of a first operational amplifier 702. The peak-brake pressure signal is fed through a resistor 703 of 1 M$\Omega$ to the non-inverting input of the operational amplifier 702. The output of the amplifier 702 is connected by line 704 to a resistor 705 the other terminal of which is connected to the inverting input of the amplifier 702.

The output of the operational amplifier 702 is further connected to an analog gate 707 of type 2N3819 the output of which is connected by line 708 to the inverting input of a second operational amplifier 709. The gate 707 is triggered by the output potential of point A in FIG. 6. The non-inverting terminal of the second operational amplifier 709 is connected by line 710 to the adjustable terminal of a potentiometer 711 the fixed terminals of which are connected to the positive and negative supply potentials, respectively. The output of the second operational amplifier 709 is fed to the base of a power transistor 712 of type BFY 50. The emitter of the transistor 712 is connected to the negative power supply potential, the collector is connected through a diode 713 of type 1N4001, bridging the inputs of a solenoid S1 for a solenoid valve 301 (FIG. 3) to the positive power supply potential.

The inverting input of the second operational amplifier 709 is connected by line 714 to the non-inverting input of a third operational amplifier 715 the inverting input of which is connected by line 716 to the adjustable terminal of a potentiometer 717. The fixed terminals of the potentiometer 717 are connected to positive and negative power supply potentials, respectively. The output of the third operational amplifier 715 is connected to the base of a second power transistor 718 of type BFY 50. The emitter of the transistor 718 is connected to the negative power supply potential, the collector of the transistor 718 is connected through a second diode 719 of type 1N4001, bridging the inputs of a solenoid S2 for a second solenoid valve 302 (FIG. 3), to the positive power supply potential.

The power supply of the operational amplifiers and the correction for offset voltages are provided as described with reference to FIG. 4.

It is seen from the description that the first operational amplifier 702 is connected to function as a subtractor and the second amplifier 709 and the third amplifier 715 to function as comparators.

The gate electrode of the analog gate 707 of type 2N3819 is connected to the base of a transistor 721 of type BC 148 through a resistor 722 having a resistance of 82 kΩ. The emitter of transistor 721 is connected to negative power supply potential, the collector thereof is connected to positive power supply potential through a resistor 723 having a resistance of 680Ω. The collector of transistor 721 is further connected to one terminal of a resistor 724 having a resistance of 1 MΩ the other terminal of which is connected to one terminal of a capacitor 725 having a capacity of 1 μF the other terminal of which is connected to negative power supply potential. The resistor 724 is bridged by a diode 726 of type OA90. The polarity of the diode 726 is chosen such that it is back-biased when the terminal connected to the junction of resistor 724 and capacitor 725 is at a lower potential than the other terminal thereof. The terminal of the capacitor 725 which is connected to resistor 724 and diode 726 is further connected to a second diode 727 of type OA90 the other terminal of which is connected to the inverting input of the operational amplifier 709 and the non-inverting input of the operational amplifier 715. The polarity of diode 727 is such that when the voltage at the non-inverting input of operational amplifier 715 is greater than the voltage across the capacitor 725, it is non-conducting.

The circuitry of FIG. 7 operates as follows: the reservoir pressure signal is subtracted from the peak-pressure unit output (FIG. 4) and the resulting signal is fed through the analog gate 707, triggered by the output A from the hysteretic unit, to the two comparators 709 and 715. The differences in pressure at which the comparators switch are fixed by the potentials from the potentiometers 711 and 717. When the difference is greater than the first fixed reference level, the first comparator switches and the solenoid-operated two-way valve 301 (FIG. 3) is triggered to increase the pressure in the reservoir. When the pressure in the reservoir is greater than the peak pressure and the difference exceeds the second fixed-reference level the solenoid-operated two-way valve 302 (FIG. 3) operates to reduce the reservoir pressure by exhausing it to atmosphere.

During braking, A is low and the transistor 721 of type BC 148 and the analog gate 707 formed by the transistor of type 2N3819 are both OFF. This allows capacitor 725 to charge. If a brake's OFF signal is not received from A during a time interval set by the resistor 724 and the capacitor 725, then full supply pressure is applied to the brakes via the reservoir, but if, during this time interval, the brake pressure is sufficient to generate an OFF signal, then transistor 721 is turned on, thereby discharging the capacitor through the diode 726. The second diode 727 blocks the pressure differential signal from being discharged.

Figure 8:
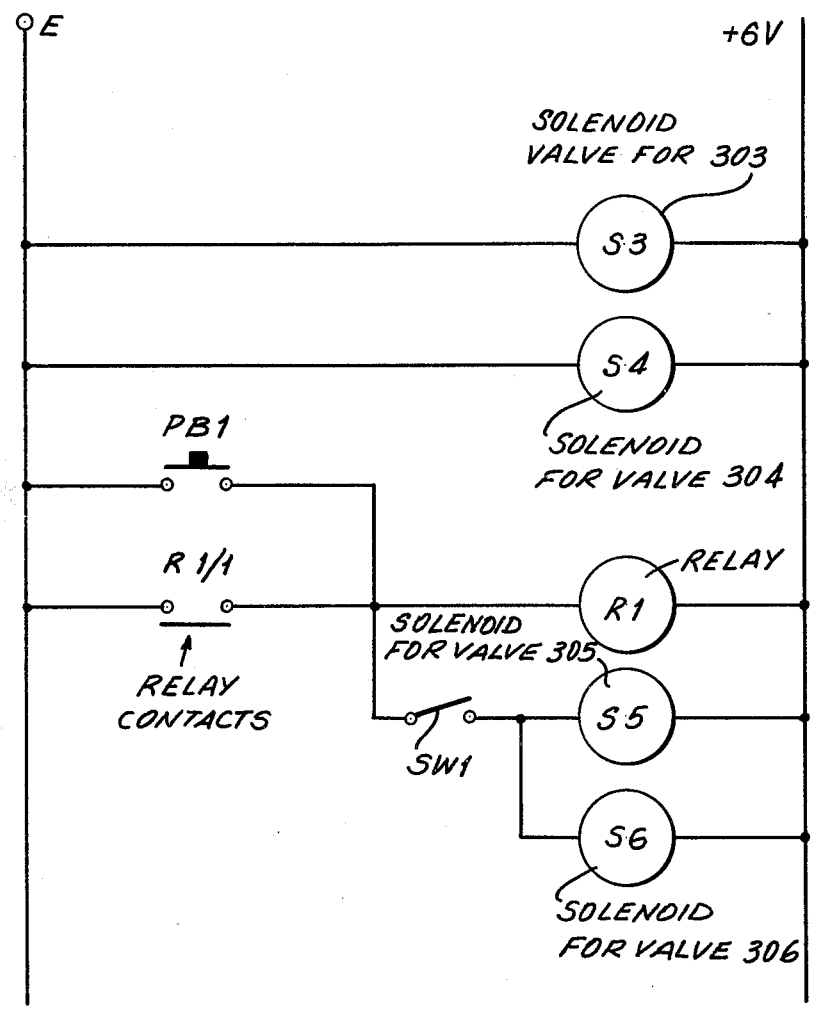
FIG. 8 diagrammatically shows a solenoid driver circuit in the anti-skid control system.

Referring now to FIG. 8, solenoid driver circuitry is shown. A solenoid S3 drives valve 303, a solenoid S4 drives valve 304, a solenoid S5 drives valve 305 and a solenoid S6 drives valve 306. PB1 is a normally open spring return push button and R1/1 is a set of normally open contacts of a relay R1. SW1 is an ON/OFF switch. One terminal of each of S3,S4,R1,S5 and S6 is connected to the positive power supply potential. The other terminals of S3 and S4 and one terminal of each of PB1 and R1/1 are connected to the junction of transistor 625 and diode 626. The other terminals of R1/1 and PB1 are directly connected to the other terminal of R1 and, through switch SW1, to the other terminal of S5 and S6.

The solenoid driver circuitry operates as follows: PB1 is depressed and released. This energizes R1 which closes the normally open contacts R1/1. The system is now set and brake pressure can be applied by closing the switch SW1. This energizes solenoids S5 and S6, operating the valve pair 305 and 306 (FIG. 3), and applies brake pressure. When the deceleration level exceeds the initial maximum deceleration reference level, and the hysteretic unit produces an OFF signal, the output B goes from a high to a low level. This causes the supply voltage to the solenoids S3,S4,S5 and S6 and relay R1 to go to zero, causing the relay contacts R1/1 to open. This disconnects the brake from the pressure supply and places it under the control of the anti-skid system.

What is claimed is:

1. An anti-skid control method for a vehicle wheel comprising the steps of detecting deceleration of the vehicle wheel and comparing the same with a reference value of minimum deceleration and also with a reference value of maximum deceleration, controlling brake force based on the comparing step so that, independently of the position of the brake operating means controlled by the driver during braking, said brake force is released from said wheel if the actual deceleration of said wheel exceeds said reference value of maximum deceleration, whereas the brake force is reapplied to the wheel if the actual deceleration of said wheel decreases below said reference value of minimum deceleration, and varying said reference value of maximum deceleration during braking in dependence of a value characteristic of the maximum frictional forces transferable between the wheel and the road surface, said method further comprising applying the brake force by pressure from a brake pressure reservoir, and varying said pressure during a braking operation by adjusting the reservoir brake pressure to the pressure level which was actually operating on the brake at the time when the reference value for maximum deceleration value was reached, said adjusting of the reservoir brake pressure being effected after the reservoir brake pressure has been released from the brake.

2. A method according to claim 1, wherein said value characteristic for the maximum frictional forces is determined by continuously evaluating a value $k$ according to the formula $$k = (1/r)(M_B - I \cdot \ddot{\theta})$$

wherein $r$ denotes the rolling radius of said wheel, $M_B$ denotes the actual brake torque acting on said wheel, $I$ denotes the moment of inertia of said wheel and $\ddot{\theta}$ denotes the actual deceleration of said wheel, and by equating said characteristic value and the value $k$, whereby in the case of a decrease of the value $k$ said characteristic value is maintained constant during subsequent time intervals, each of which has a predetermined duration, the constant value of said characteristic value being equal to the initial value of $k$ at the beginning of the respective time interval, this being repeated until in the course of a time interval the actual value of $k$ reaches or exceeds said initial value.

3. A method according to claim 2, wherein each time interval has a duration between 1/10 sec. and 1/2 sec.

4. A method according to claim 1, wherein the reference value of maximum deceleration is set to a predetermined initial value at the beginning of a braking operation and is replaced by a new value only if the value of the increasing characteristic value exceeds said predetermined initial value or if the characteristic value reaches a first maximum.

5. A method according to claim 1, wherein an initial predetermined reservoir brake pressure is used at the beginning of a braking operation until the actual deceleration of the wheel firstly exceeds the reference value of maximum deceleration and the reservoir brake pressure is first released from said wheel.

6. A method according to claim 5, wherein the initial predetermined reservoir brake pressure is adjustable by the brake operating means controlled by the driver.

7. An anti-skid control system for a brake-equipped vehicle wheel, said system comprising means for detecting the actual deceleration of the wheel, means for applying a reservoir brake pressure to said brakes to actuate the same when the actual deceleration of said wheels decreases below a predetermined value of minimum deceleration and for releasing said reservoir brake pressure from said brakes when the actual deceleration of said wheel exceeds a reference value of maximum deceleration, signal generating means to generate input signals for the means for applying and releasing the reservoir brake pressure, said signal generating means comprising means for determining the difference between a signal dependent on the brake torque and a signal proportional to the actual deceleration of the wheel, means for continuously storing the maximum value of said difference, and means for generating an output signal related to said maximum difference stored.

8. An anti-skid control system according to claim 7 wherein said means for determining the difference comprises an electronic circuit means.

9. An anti-skid control system according to claim 8 wherein said electronic circuit means for determining said difference comprises an operational amplifier connected to operate as a subtractor and having two inputs, the signal dependent on the brake torque being applied as a voltage signal to one input of the subtractor and the signal proportional to the actual deceleration of the wheel being applied to the second input thereof.

10. An anti-skid control system according to claim 9 wherein the means for continuously storing the maximum value of the difference comprising a capacitor, a diode, said capacitor being connected via said diode to the output of said subtractor, said diode being arranged such that it is non-conducting if the magnitude of the output voltage signal of the subtractor is smaller than the magnitude of the voltage signal stored at the capacitor.

11. An anti-skid control system according to claim 10 further comprising a further operational amplifier, the output of the subtractor being connected to the non-inverting input of said further operational amplifier, the output of which is connected via said diode to said capacitor, the junction of the diode and capacitor being connected to the inverting input of said further operational amplifier.

12. An anti-skid control system according to claim 10 further comprising a first buffer amplifier and second and third diodes the junction of the diode and capacitor being connected to the non-inverting input of said first buffer amplifier, said second diode being connected to the output of said first buffer amplifier, said third diode being connected to a variable pre-set voltage, the other terminals of the second and third diode being connected to each other and to the input of the means for applying and releasing the reservoir brake pressure, the polarity of the second and third diode being chosen such that they are back-biased when the potential of the terminals connected to each other is higher than the output potential of the first buffer amplifier and the variable voltage respectively.

13. An anti-skid control system according to claim 12 further comprising a second buffer amplifier, the other terminals of said second diode and third diodes being connected to the means for applying and releasing the reservoir brake pressure via said second buffer amplifier.

14. An anti-skid control system according to claim 10 comprising a discharging resistor connected to said capacitor to gave a discharging time constant for the capacitor.

15. An anti-skid control system according to claim 14 wherein said discharging resistor is adjustable.

16. An anti-skid control system according to claim 7 further comprising means to set an initial value for said reference value of maximum deceleration.

17. An anti-skid control system according to claim 7 wherein said means for applying and releasing said reservoir brake pressure comprises a first comparator circuit comparing the actual deceleration of the wheel with the predetermined value for minimum deceleration and a second comparator circuit comparing the actual deceleration of said wheel with a reference deceleration, corresponding to said maximum difference.

18. An anti-skid control system according to claim 17 further comprising valve means controlling reservoir brake pressure, said first comparator circuit comprising a first operational amplifier connected to operate as a comparator, to the inverting input of which a voltage proportional to the predetermined value for minimum deceleration is applied, and to the non-inverting input of which a voltage proportional to said actual deceleration of the wheel is applied, said second comparator circuit comprising a second operational amplifier connected to operate as a comparator, to the inverting input of which said voltage proportional to said actual deceleration of said wheel is applied and to the non-inverting input of which a voltage proportional to a wheel deceleration corresponding to said maximum difference value is applied, a first differentiating circuit connected to the output of said first comparator a second differentiating circuit to the output of said second comparator, first and second equally polarized diodes and a bistable unit having a first output controlling said valve means controlling the reservoir brake pressure, the output of said first differentiating circuit being connected via said first diode to the set input of said bistable unit, the output of said second differentiating circuit being connected via said second diode to the reset input of said bistable unit.

19. An anti-skid control system according to claim 18 comprising means for generating a predetermined initial state of the outputs of said bistable unit.

20. An anti-skid control system according to claim 18 wherein said means for generating a predetermined initial state comprises a transistor having an emittercollector circuit connected between one terminal of a supply voltage means and the second output of said bistable unit, and a capacitor connected in series with a resistor between the other terminal of the supply voltage means and the base of the transistor.

21. An anti-skid control system according to claim 7 further comprising a brake pressure reservoir and reservoir brake pressure control means to control the pressure level in said brake pressure reservoir.

22. An anti-skid control system according to claim 21 wherein said reservoir brake pressure control means comprises means for storing a signal proportional to said actual brake pressure acting on the brakes of the wheel at that time.

23. An anti-skid control system according to claim 22 wherein said means for storing comprises a capacitor and a first analog gate which can be triggered by the first output of the bistable unit charging said capacitor.

24. An anti-skid control system according to claim 23 further comprising a buffer amplifier, a second analog gate and subtractor means having two inputs at the first of which a voltage is applied via said buffer amplifier, said voltage being proportional to the voltage at the capacitor and at the second input of which a voltage is applied which is proportional to the pressure in the pressure reservoir, the output of said subtractor means being connected via said second analog gate which can be triggered by the second output of said bistable unit to the input of a comparator means for comparing the difference in the signal from the second analog gate with upper and lower reference values.

25. An anti-skid control system according to claim 24 comprising means connected to the output of the second analog gate for generating in a predetermined time period a voltage signal which exceeds the upper value when there is no trigger signal from the second output of the bistable unit to the second analog gate.

26. An anti-skid control system according to claim 25 wherein said means for generating a voltage signal comprises a transistor, first and second resistors, and a capacitor chargeable through said first resistor and connected in parallel to the emitter-collector circuit of said transistor, the base of which is connected by said second resistor to the second input of said bistable unit.

27. An anti-skid control system according to claim 21 comprising a first valve means connecting the brake pressure reservoir to a main pressure source with a constant pressure level and a second valve means connecting the brake pressure reservoir to atmosphere, both said first and second valve means being controlled by said reservoir brake pressure control means.

28. An anti-skid control system according to claim 27 further comprising means for generating an initial reservoir brake pressure signal for the beginning of a brake operation.

29. An anti-skid control system according to claim 28 said means for generating an initial reservoir brake pressure signal comprising a conducting line connecting a main pressure source with the brake line leading to the brake, a third valve means controlling said conducting line.

30. An anti-skid control system according to claim 29 further comprising a shut-off means arranged behind the outlet of the brake pressure reservoir to control flow in the brake line to the brake.

31. An anti-skid control system according to claim 30 further comprising display means for indicating the actual reference value for maximum deceleration determined during braking operation.

32. An anti-skid control system according to claim 31 where said valve means are electronically operable.

33. An anti-skid control system according to claim 7 wherein the brake pressure fluid is compressed air.

34. An anti-skid control method for a vehicle wheel comprising the steps of detecting deceleration of the vehicle wheel and comparing the same with a reference value of minimum deceleration and also with a reference value of maximum deceleration, controlling brake force based on the comparing step so that, independently of the position of the brake operating means controlled by the drive during braking, said brake force is released from said wheel if the actual deceleration of said wheel exceeds said reference value of maximum deceleration, whereas the brake force is reapplied to the wheel if the actual deceleration of said wheel decreases below said reference value of minimum deceleration, and varying said reference value of maximum deceleration during braking in dependence of a value characteristic of the maximum frictional forces transferable between the wheel and the road surface, said value characteristic for the maximum frictional forces being determined by continuously evaluating a value $k$ according to the formula $$k = (1/r)(M_B - I \cdot \ddot{\theta})$$

wherein $r$ denotes the rolling radius of said wheel, $M_B$ denotes the actual brake torque acting on said wheel, $I$ denotes the moment of inertia of said wheel and $\ddot{\theta}$ denotes the actual deceleration of said wheel, and by equating said characteristic value and the value $k$, whereby in the case of a decrease of the value $k$ said characteristic value is maintained constant during subsequent time intervals, each of which has a predetermined duration, the constant value of said characteristic value being equal to the initial value of $k$ at the beginning of the respective time interval, this being repeated until in the course of a time interval the actual value of $k$ reaches or exceeds said initial value.

35. A method according to claim 34, wherein each time interval has a duration between 1/10 sec. and ½ sec.

* * * * *